(12) United States Patent
Olsérius et al.

(10) Patent No.: US 9,745,648 B2
(45) Date of Patent: Aug. 29, 2017

(54) POWDER (71) Applicant: HÖGANÄS AB (PUBL), Höganäs (SE)

(72) Inventors: Peter Olsérius, Helsingborg (SE); Barbara Maroli, Höganäs (SE)

(73) Assignee: HÖGANÄS AB (PUBL), Höganäs (SE)

( * ) Notice: Subject to any disclaimer, the term of this patent is extended or adjusted under 35 U.S.C. 154(b) by 0 days.

(21) Appl. No.: 14/898,890

(22) PCT Filed: Jun. 13, 2014

(86) PCT No.: PCT/EP2014/062466
§ 371 (c)(1),
(2) Date: Dec. 16, 2015

(87) PCT Pub. No.: WO2014/202488
PCT Pub. Date: Dec. 24, 2014

(65) Prior Publication Data
US 2016/0138144 A1    May 19, 2016

(30) Foreign Application Priority Data

Jun. 17, 2013 (EP) ................................. 13172210
Feb. 7, 2014 (EP) ................................. 14154243

(51) Int. Cl.
| | | |
|---|---|---|
| C22C 38/54 | (2006.01) | |
| C23C 4/06 | (2016.01) | |
| C22C 1/04 | (2006.01) | |
| C22C 19/05 | (2006.01) | |
| C22C 33/02 | (2006.01) | |
| C22C 38/08 | (2006.01) | |
| B23K 35/30 | (2006.01) | |
| C22C 38/40 | (2006.01) | |
| C23C 24/10 | (2006.01) | |
| B22F 1/00 | (2006.01) | |
| B23K 10/02 | (2006.01) | |
| B23K 26/34 | (2014.01) | |
| B23K 35/02 | (2006.01) | |
| B32B 15/01 | (2006.01) | |
| C22C 30/00 | (2006.01) | |
| C22C 38/02 | (2006.01) | |

(52) U.S. Cl.
CPC ............ *C22C 38/54* (2013.01); *B22F 1/0003* (2013.01); *B23K 10/027* (2013.01); *B23K 26/34* (2013.01); *B23K 35/0255* (2013.01); *B23K 35/308* (2013.01); *B23K 35/3033* (2013.01); *B23K 35/3053* (2013.01); *B23K 35/3066* (2013.01); *B23K 35/3086* (2013.01); *B32B 15/011* (2013.01); *C22C 1/0433* (2013.01); *C22C 19/05* (2013.01); *C22C 19/058* (2013.01); *C22C 30/00* (2013.01); *C22C 33/0285* (2013.01); *C22C 38/02* (2013.01); *C22C 38/08* (2013.01); *C22C 38/40* (2013.01); *C23C 4/06* (2013.01); *C23C 24/106* (2013.01); *B22F 2301/35* (2013.01)

(58) Field of Classification Search
CPC ............................. C22C 1/0433; C22C 38/54
USPC ................................................ 420/54
See application file for complete search history.

(56) References Cited

FOREIGN PATENT DOCUMENTS

| | | | | |
|---|---|---|---|---|
| CN | 102 166 850 A | | 8/2011 | |
| CN | 102166850 | * | 8/2011 | ............. B32B 15/08 |
| CN | 102 382 491 A | | 3/2012 | |
| DE | 19721818 A1 | * | 12/1998 | ............... C23C 4/00 |
| FR | 1 404 049 A | | 6/1965 | |

OTHER PUBLICATIONS

International Search Report (PCT/ISA/210) issued on Oct. 8, 2014, by the European Patent Office as the International Searching Authority for International Application No. PCT/EP2014/062466.
Written Opinion (PCT/ISA/237) issued on Oct. 8, 2014, by the European Patent Office as the International Searching Authority for International Application No. PCT/EP2014/062466.
Jahnke et al., "Microstructural investigations of a nickel-based repair coating processed by liquid phase diffusion sintering", Thin Solid Films, Dec. 1983, pp. 225-235, vol. 110, No. 3.
Sharma et al., "Microstructural Characterization and Properties Evaluation of Ni-Based Hardfaced Coating on AISI 304 Stainless Steel by High Velocity Oxyfuel Coating Technique", Metallurgical and Materials Transactions, Sep. 2012, pp. 372-380, vol. 44, No. 1.
Hou et al., "Influence of nano-Al2O3 particles on the microstructure and wear resistance of the nickel-based alloy coating deposited by plasma transferred arc overlay welding", Surface and Coatings Technology, Jan. 2011, pp. 2806-2812, vol. 205, No. 8-9.

\* cited by examiner

*Primary Examiner* — Weiping Zhu
(74) *Attorney, Agent, or Firm* — Buchanan Ingersoll & Rooney P.C.

(57) ABSTRACT

The present invention concerns a new metal powder which is useful for coating cast iron parts. The invention also relates to a method for coating cast iron parts by using the new metal powder. Of special importance is the possibility to use the metal powder for coating the surfaces of glass moulds. The invention also relates to metal parts, such as cast iron parts, or glass moulds which are coated by the metal powder.

8 Claims, 6 Drawing Sheets

POWDER

FIELD OF THE INVENTION

The present invention concerns a new metal powder which is useful for coating cast iron parts. The invention also relates to a method for coating cast iron parts by using the new metal powder. Of special importance is the possibility to use the metal powder for coating the surfaces of glass moulds. The invention also relates to metal parts, such as cast iron parts, or glass moulds which are coated by the metal powder.

BACKGROUND

The life-time of metal tools being worked under severe wear- and corrosion conditions can be prolonged by coating the tool with a wear- and corrosion resistant surface. Such metal tools are found in various industries and may be made for example of low alloyed steels, bronze, stainless steel, or cast iron.

Many industries have cast iron parts which are subjected to wear, corrosion and thermal cycling. These include hollow glass manufacturing, automotive, marine, ground engaging tools etc. An example of this is tools used for the production of glass bottles and jars. To improve the lifetime of the equipment, critical parts (e.g. mould and guide ring edges, plungers and neck rings surfaces) are coated with nickel based self-fluxing powders. Different hardfacing methods are used: for example plungers are coated by flame spray followed by fusing or HVOF followed by fusing, while mould edges, neck rings, guide rings are coated using either powder welding or plasma transfer arc (PTA)-welding.

Glass forming takes place in two steps: a pre-moulding, carried out in a so called blank mould, and final moulding, carried out in a so called finish mould. The temperature of the glass in contact with the mould is roughly 1100° C. in the blank mould and 700-800° C. in the finished mould. The temperature of the mould can fluctuate up to 550-600° C. but the surface temperature can be even higher during short time. Moreover, the surface of the mould is in contact with chemically active glass. Important requirements for a mould are good surface finish, good thermal shock resistance, resistance to dimensional change, resistance to oxidation and growth. This leads to three critical problems: sticking/adhesion of glass to the die surface and formation of irregularities (surface roughening); oxidation of the die, and; wear/pitting of the die.

These problems result in imperfections in the glass products and limit the service life of the die.

In general, self-fluxing alloys are defined as iron-base, nickel-base, cobalt-base or copper-base alloy containing 0.5-5% boron, 0.1-6% silicon and up to 3% carbon in combination with strong carbide and boride formers as W, and/or Mo and/or Cr. The most commercially used self-fluxing alloys are Ni based alloys containing boron and silicon either singly or in combination, in excess of 1.5%. Boron and silicon decrease the melting point by several hundred degrees; they promote wetting by reducing oxide of Ni, Co, Cr and Fe; they form a light low melting point boron silicate glass which flows to the surface of the deposit and protect it from oxidation. Boron is also a potent hardener forming with nickel, chromium, molybdenum, tungsten and iron hard borides. In the case of Ni-based self-fluxing alloys boron content ranges from 1-3.5%, depending on chromium content, which can be as high as 16%.

The substrate materials used in various industries, may be low alloyed steels, nodular or lamellar cast iron, bronze, or stainless steel. For some applications, lamellar cast iron is the preferred choice due to good thermal conductivity which allows for higher production rate and lower cost. Hardfacing by overlay welding of lamellar cast iron is difficult as cast iron is sensitive to cracking due to the low strength of the graphite lamellas, low ductility and thermal expansion coefficient close to zero. Crack formation may also occur in hardfacing of other types of substrates, such as bronze or stainless steel. Presently, crack free coating can be obtained only if overlay welding of cast iron parts is carried out with nickel based self-fluxing grades.

Due to cost and environmental and health concerns, it has long been a wish to reduce the alloying cost by introducing more Fe into the powders, but attempts to do so have not been successful, resulting in increased crack formation in the lamellar cast iron heat affected zone (HAZ).

SUMMARY OF THE INVENTION

The present invention provides a solution to the above mentioned problems. The inventors have shown that it is possible to raise the iron content of a metal powder, and to use this powder for overlay welding such as PTA welding of parts made of cast iron e.g. lamellar cast iron, while avoiding crack formation.

By diluting the nickel based grades with a relatively high amount of iron, while optimizing the amount of chromium and nickel, and using this alloy powder for surface coating a metal substrate, e.g. PTA welding of cast iron, a coating with the following properties is achieved: hardness similar to the nickel based self fluxing grades currently used; similar welding and machining behaviour as in the nickel based grades currently used; cracks in the cast iron heat affected zone can be avoided and/or reduced to a size comparable to that of the nickel based grades; less pores and less free graphite than in the nickel based self-fluxing grades currently used; lower material costs; lesser impact on the environment and less harmful working conditions during handling and welding.

The amount of Cr and nickel may be optimized in order to minimize the total length of the cracks in the cast iron heat affected zone, resulting in total crack lengths from 0 to a maximum of 1100 μm.

By diluting the iron based coatings with nickel, the amount of free graphite and porosity in the coating is progressively decreased, and at 16% nickel, the amount of pores and free graphite is less than what is seen in commonly used Ni-based materials.

The invention also has the advantage of minimizing the use of nickel, thus lowering the potential impact on health and/or environment during powder production, handling and welding

DETAILED DESCRIPTION

Figure Legends.

Throughout the text, a metal part or component (e.g. a cast iron component) to be covered or which is covered, will be referred to as a substrate.

The method of coating the surface of a substrate may be termed "surface coating" or "hardfacing" or overlay welding.

The present invention is based on the realization that a metal powder having a relatively high Fe-content can be used for surface coating substrates, e.g. cast iron, low alloyed carbon steels, bronze, or stainless steel parts, with minimal formation of cracks between coating and substrate. The method used for the surface coating may be any method by which a metal powder can be deposited on cast iron parts. Such methods include e.g. plasma transfer arc (PTA) or laser cladding; thermal spray methods such as HVOF or HVAF, flame spray, plasma spray, or cold spray.

The metal powder used according to the invention may be produced by atomizing a melt having the appropriate amounts of alloying elements. Gas-gas, or gas-water atomization are examples of such methods. The choice of particle size depends on the deposition method used for surface coating and the equipment selected, and is within the capacity of the skilled person. The particle size may be in the range of 10 to 250 μm, preferably between 53 to 212 μm, for PTA, 45 to 150 μm for laser cladding, 36-125 μm for flame spray and between 53 μm to 10 μm for HVOF, HVAF, cold spray or plasma spray.

The invention provides a;
1. Metal powder adapted for surface coating by thermal spraying or weld cladding metal parts, consisting of 5-20% Cr; 0.5-5% Si; 0.2-3.5% B; 12-70% Ni; 0-1.5% C, 0-2% P; the balance being Fe.
2. Metal powder according to point 1, consisting of 5-9% Cr; 2-3% Si; 0.2-2% B; 16-55% Ni; 0-1.5% C, 0-2% P; the balance being Fe.
3. Metal powder according to point 1 or 2, consisting of 5.5-8% Cr, 2-3% Si; 0.2-2% B, 16-50% Ni; 0-1.5% C, 0-2% P; the balance being Fe.
4. Metal powder according to any one of points 1-3, adapted for surface coating by plasma transfer arc welding or laser cladding.
5. Metal powder according to any one of points 1-4, adapted for surface coating cast iron.
6. Use of the metal powder according to any one of points 1 to 5 for plasma transfer arc welding or laser cladding of cast iron components.
7. Metal or cast iron component having a surface coating made using a powder according to any one of points 1-5.

The metal powder may be used for surfacing of both nodular and lamellar cast iron.

In yet another aspect, the invention provides cast iron parts which have been coated, or surfaced, using the metal powder.

EXAMPLES

Example 1

The powders used in the following examples were made by conventional gas atomization and were then sieved between 53-150 μm. The content of the various powders is shown in Table 1.

| Sample | C | B | Si | Cr | Al | Other | Ni | Fe | HV30 | Crack prevention |
|---|---|---|---|---|---|---|---|---|---|---|
| Comparative example 1 | 0.2 | 1.0 | 2.9 | 6 | 1 | | 86 | 3 | 323 | ++ |
| Comparative example 2 | 0.3 | 1.3 | 3.6 | 7 | | | 85 | 3 | 340 | ++ |
| Comparative example 3 | 0 | 0.9 | 1.6 | 15 | | | 18 | 65 | 259 | − |
| A | 0.7 | 0.8 | 2.4 | 20 | | | 17 | 59 | 316 | − |
| B | 0.0 | 1.4 | 2.4 | 19 | | | 16 | 62 | 353 | − |
| C | 0.8 | 0.8 | 2.4 | 10 | | | 16 | 70 | 319 | − |
| D | 0.0 | 1.4 | 2.3 | 6 | | | 16 | 74 | 283 | + |
| F | 0.0 | 1.5 | 2.5 | 7 | | | 35 | 54 | 347 | ++ |
| G | 0.0 | 1.5 | 2.5 | 12 | | | 35 | 49 | 331 | − |
| H | 0.0 | 1.5 | 2.5 | 20 | | | 35 | 41 | 330 | − |
| I | 0.0 | 1.5 | 2.8 | 7 | | | 50 | 39 | 326 | ++ |
| K | 0.2 | 1.4 | 2.5 | 7 | | | 50 | 39 | 356 | ++ |
| L | 0.5 | 1.5 | 2.4 | 7 | | | 50 | 39 | 388 | ++ |
| M | 0.0 | 1.5 | 2.6 | 12 | | | 51 | 33 | 353 | ++ |
| N | 0.0 | 1.5 | 2.8 | 19 | | | 50 | 27 | 353 | ++ |
| O | 0.0 | 1.5 | 3.2 | 6 | | P = 2% | 49 | 38 | 382 | ++ |
| P | 0.0 | 1.4 | 2.6 | 6 | | Mn = 15% | 35 | 40 | 326 | ++ |
| R | 0.1 | 1.6 | 2.5 | 7 | | | 69 | 20 | 347 | ++ |
| S | 0.0 | 0.4 | 2.8 | 7 | | | 50 | 40 | 232 | ++ |
| T | 0.0 | 1.6 | 3.6 | 7 | | | 50 | 38 | 373 | ++ |
| U | 0.0 | 2.3 | 2.5 | 7 | | | 50 | 38 | 414 | ++ |

Note:
All amounts in wt %.
"++" denotes total crack length shorter than 500 μm; "+" denotes cracks between 500 and 1000 μm; and "−" denotes cracks longer than 1000 μm.

Example 2

Lamellar cast iron pucks with 90 mm diameter and approx. 35 mm in height were coated as follows. The pucks were pre-heated in a furnace in air at 380° C. One layer with width of approximately 1 cm was deposited along the puck diameter. The following welding parameters were used: welding current 90-105 A, welding speed 6-7 cm/min, feeding rate 28-30 g/min, feed gas of 3.5 l/min, oscillation of the PTA beam, pilot current of 1-2 A. After welding the samples were cooled in vermiculite.

Example 3

Lamellar cast iron pucks with 90 mm diameter and approx. 35 mm in height were laser cladded as follows. The pucks were pre-heated in a furnace in air at 380° C. One layer with width of approximately 1 cm was deposited along the puck diameter by using a 4 kW direct diode laser with a spot of 12×2 mm, equipped with a co-axial powder feeder. The following laser cladding parameters were used: 2 kW power, cladding speed between 4-5 mm/sec, powder feed rate 31 g/min and shield gas 10-11 l/min. The results achieved are shown in table 2.

TABLE 2

| Sample | C | B | Si | Cr | Ni | Fe | Crack prevention |
|---|---|---|---|---|---|---|---|
| V | 0.0 | 1.5 | 2.8 | 7 | 50 | 39 | ++ |

Example 4

The as-welded components were evaluated with respect to:
crack formation in the coating by using die penetrants. The samples were coated with a highly penetrating red dye which is pulled into surface defects or cracks through capillary action. After a period of time excess dye is removed from the surface and a white developer is applied. The developer draws the penetrant out of imperfections that are open to the surface and allows seeing if cracks in contact with the surface are present. None of the coatings exhibited cracks in contact with the surface.

Example 5

Dilution from substrate material. The sample surface was slightly grinded to remove surface oxides and chemistry of the coating was analyzed in two areas of roughly 7 mm² each by a handheld X-ray fluorescence analyzer. The average coating chemistry was than evaluated. By knowing the chemical composition of the powder and of the substrate material dilution was calculated as follows:

$$\text{Dilution} = \rho_c(X_{c+s} - X_c) / \rho_s(X_s - X_{c+s}) + \rho_c(X_{c+s} - X_c)$$

$\rho_c$=Density of melted powder alloy (kg/m³)
$\rho_s$=Density of substrate material (kg/m³)
$X_{c+s}$=weight % of element X in the deposit
$X_c$=weight % of element X in the powder alloy
$X_s$=weight % of element X in the substrate
The tests made showed dilutions in the range of 5-20% for all materials.

Example 6

Vickers hardness with a load of 30 kgf (HV30) was measured with a Buehler hardness meter on the coating surface. Prior to hardness measurement the coatings were plane grinded with an aluminum oxide stone to achieve a flat surface parallel to bottom of the sample. Plane grinding was followed by fine grinding with 500 and then 800 mesh silicon carbide papers. Five indentations were carried out on the coating surface and the average hardness was calculated.

Example 7

Microstructure. The samples were analyzed under a light optical microscope. The samples for metallographic investigation were cut perpendicular to the welding direction approximately in the middle of the coating. The samples were molded in bakelite and then plane grinded on an $Al_2O_3$ stone and on a 9 μm cloth. The samples were than polished on a 3 μm cloth followed by 1 μm cloth to achieve a mirror like surface. The sample were investigated in the as-polished conditions to evaluate the degree of bonding to the substrate, number of pores >100 μm in longest length, presence of free graphite, cracks in the coating and/or in the cast iron heat affected zone. No cracks were found in the coatings. In some samples cracks were observed in the cast iron HAZ starting at the coating edges. The length of the cracks was measured and the total crack length at both coating edges is reported in table 1 for the PTA coated samples and table 2 for the laser cladded samples. The number of pores above >100 μm in longest length in the examined cross section were between 0-5 and in similar amount as in the comparative examples 1-3.

Example 8

Figure 1:
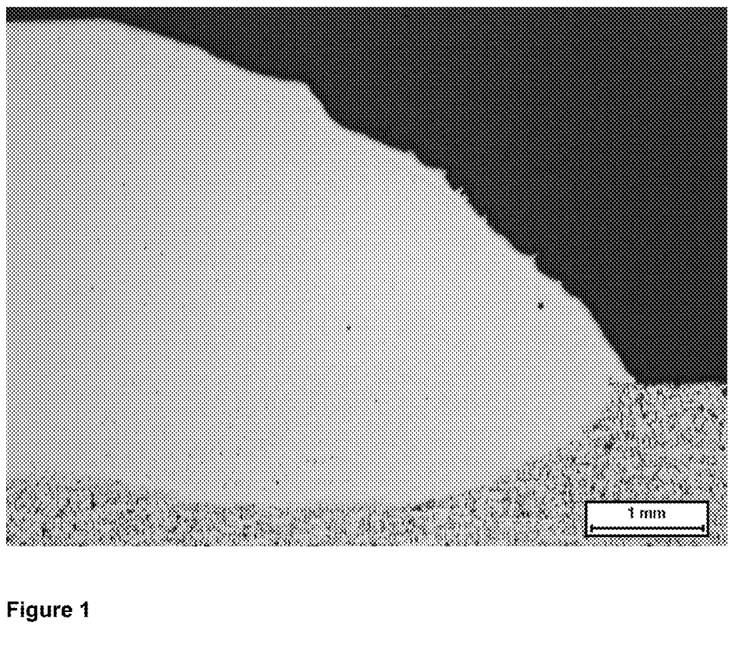
FIG. 1. LOM micrograph showing the cross section of sample I overlay welded on lamellar cast iron. The bonding area between coating and substrate is shown. No cracks are observed in the cast iron HAZ.
Figure 2:
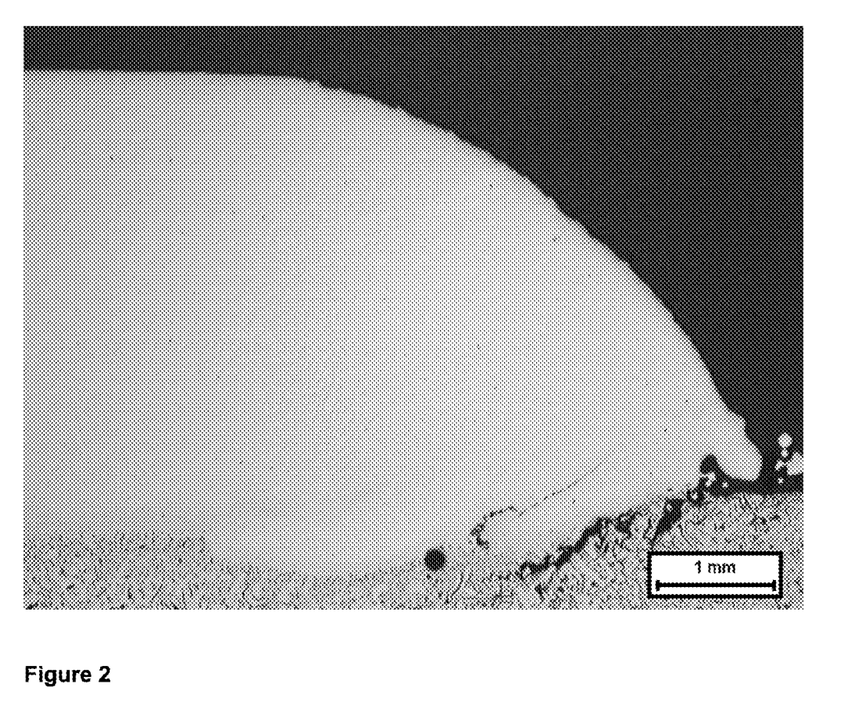
FIG. 2. LOM micrograph showing the cross section of comparative example 3 overlay welded on lamellar cast iron. Bonding between coating and substrate is shown. A crack is observed in the cast iron HAZ starting at the coating edges.
Figure 3:
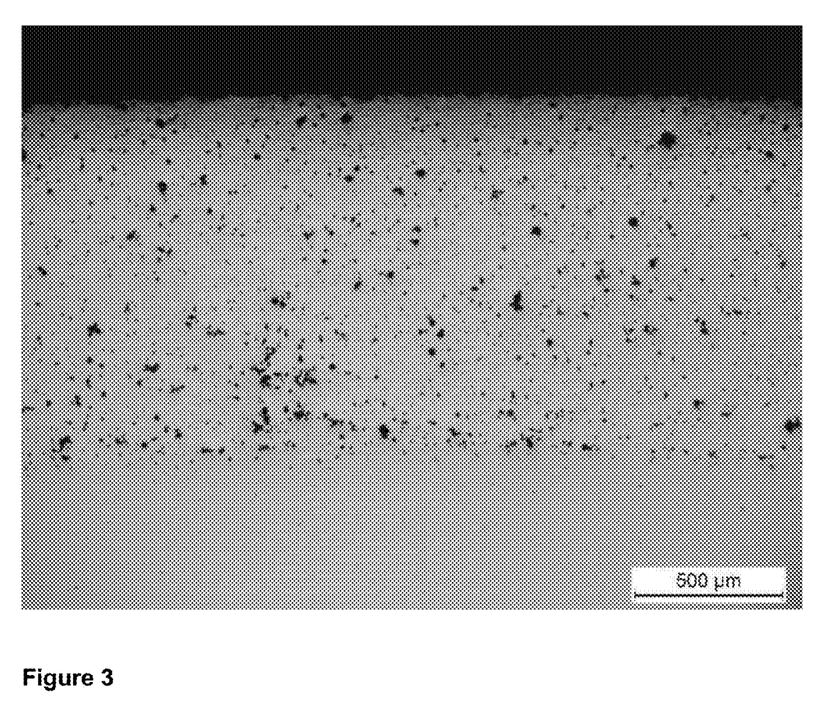
FIG. 3. Surface coating results from example 8.

Powder I was deposited on a low alloyed carbon steel by flame spray followed by fusing. Cylindrical rods with 20 mm diameter were coated. The rods were first blasted and then sprayed with a Metco 5P-II gun. Fusion was carried out by an oxy-acetylene torch in air. The rods were rotated both during spraying and fusion. Good bonding to the substrate and normal porosity were achieved. See FIG. 3

Example 9

Figure 4:
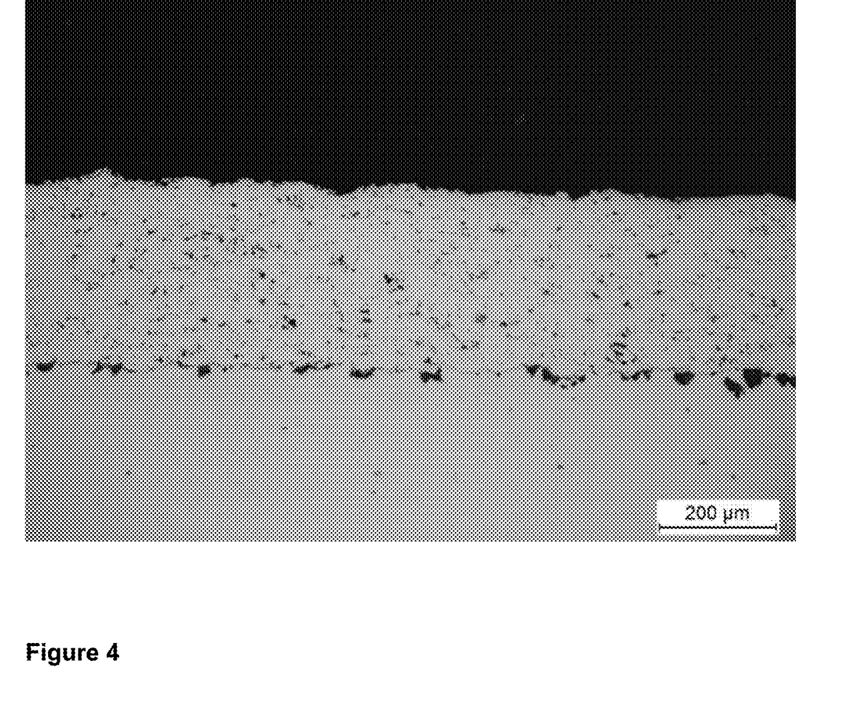
FIG. 4. Surface coating results from example 9.

Powder I was deposited on a low alloyed carbon steel by UniqueCoat Technologies M3 HVAF gun. Selected particle size for the test was 25-37 μm. Coins with approximately 20 mm in diameter were coated. Prior to coating the samples were grit blasted. Air and propane were used as combustion gases, while air was used as carrier gas. Feed rate was 100 g/min. Overview of the coating is shown in FIG. 4. The black particles in the bonding areas is alumina from the grit blasting step.

Example 10

Figure 5:
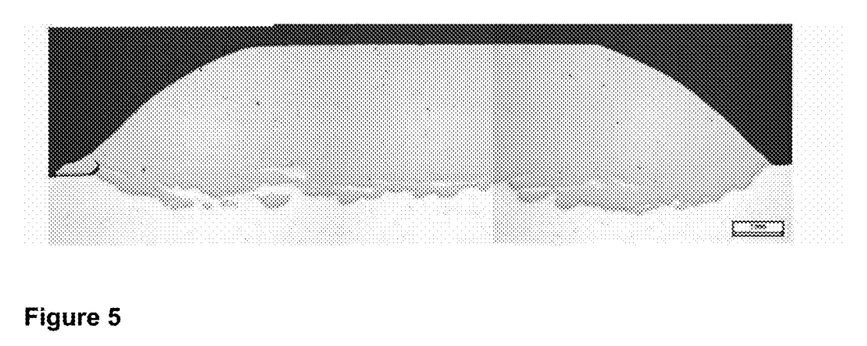
FIG. 5. Surface coating results from example 10.

Powder I was deposited by PTA welding on an aluminum bronze substrate type SS 5716-15 (typical chemistry 77-82% Cu, 8.5-11% Al, 4-6% Ni, 2.5-5% Fe). Coating was carried out on pucks with ca. 920 mm in diameter and 30 mm in height. Prior to coating the pucks were pre-heated at 450° C. in air. The following process parameters were used effect 90 A, welding speed 7 cm/min, feed rate 25 g/min. One layer was deposited. A crack free coating with good bonding to the substrate could be achieved. FIG. 5.

Example 11

Powder I was deposited by PTA welding on a stainless substrate type AISI316L. Coating was carried out on bars with size of 50×100×30 mm. For coating the following process parameters were used effect 110 A, welding speed 7 cm/min, feed rate 25 g/min. One layer was deposited. A crack free coating with good bonding to the substrate was achieved.

Example 12

Figure 6:
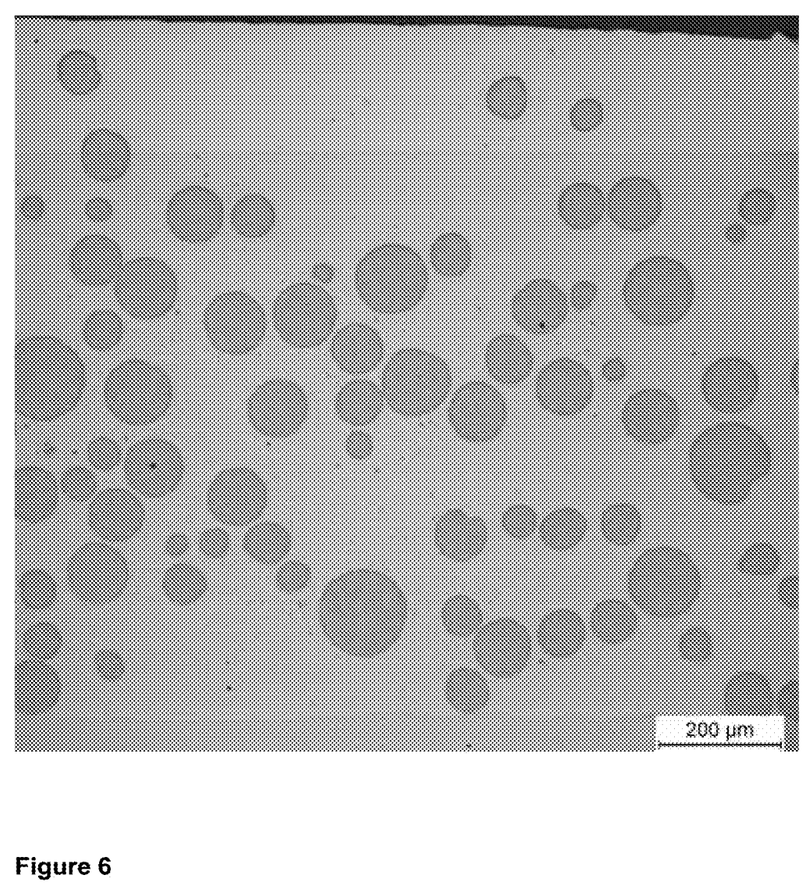
FIG. 6. Surface coating results from example 11.

50% of powder I was admixed with 50% spherical cast tungsten carbides $WC/W_2C$. The mix was laser cladded by using a 4 kW diode laser. The mix was cladded using a power of 3 kw and a cladding speed of 5 mm/sec. A cross section of the coating is shown in FIG. 6.

The invention claimed is:

1. Metal powder adapted for surface coating by thermal spraying or weld cladding metal parts, consisting of:
   5.5-8% Cr;
   2-3% Si;
   0.2-2% B;
   16-50% Ni;
   0-1.5% C;
   0-2% P;
   the balance being Fe.

2. Metal powder according to claim 1, wherein the metal powder has 16% Ni.

3. Metal powder according to claim 1, adapted for surface coating by plasma transfer arc welding or laser cladding.

4. Metal powder according to claim 1, adapted for surface coating cast iron.

5. Metal powder according to claim 4, wherein the cast iron coated with the metal powder comprises a cast iron heat affected zone possessing total crack lengths of less than 1100 μm.

6. Metal powder according to claim 1, wherein the metal powder possesses a particle size of 10 μm to 250 μm.

7. Method of using the metal powder according to claim 1 for plasma transfer arc welding or laser cladding of cast iron components.

8. Metal or cast iron component having a surface coating made using a powder according to claim 1.

* * * * *